United States Patent [19]
Zeger et al.

[11] Patent Number: 5,099,493
[45] Date of Patent: Mar. 24, 1992

[54] MULTIPLE SIGNAL RECEIVER FOR DIRECT SEQUENCE, CODE DIVISION MULTIPLE ACCESS, SPREAD SPECTRUM SIGNALS

[75] Inventors: Andrew E. Zeger; Burton S. Abrams, both of Wyndmoor, Pa.

[73] Assignee: Zeger-Abrams Incorporated, Philadelphia, Pa.

[21] Appl. No.: 572,629

[22] Filed: Aug. 27, 1990

[51] Int. Cl.⁵ .............................................. H04L 27/30
[52] U.S. Cl. .......................................... 375/1; 380/34; 370/18
[58] Field of Search ................. 375/1, 96; 380/33, 34; 370/18

[56] References Cited
U.S. PATENT DOCUMENTS 4,885,757  12/1989  Provence .............................. 375/96

OTHER PUBLICATIONS

"The Theory of Spread Spectrum Communications—A Tutorial", IEEE Transactions on Communications, vol. COM-30, No. 5, May 1982, pp. 855-884, Pickholtz et al.
"Adaptive Cancellation of Mutual Interference in Spread Spectrum Multiple Access", IEEE International Conference on Communications, Jun. 8-12, 1980, pp. 44.4-44.4.5 in, vol. 3 of ICC Conference Record, Thomas K. Kashihara.
"Multistage Detection in Asynchronous Code Division Multiple Access Communication", IEEE Transactions on Communications, vol. COM-38, No. 4, Apr. 1990, pp. 509-519, Varanasi et al.

Primary Examiner—Bernarr E. Gregory
Attorney, Agent, or Firm—Beveridge, DeGrandi & Weilacher

[57] ABSTRACT

Disclosed is a multiple-signal receiver system for direct sequence, code division multiple access (CDMA), spread spectrum (SS) signals. The receiver is structured to overcome inter-signal interference during signal acquisition and data reception even when the ratio of received signal powers exceeds the bandwidth spreading ratio of the signals. The receiver contains one processing channel for each signal in which correlation with the spread spectrum code of its particular signal is used to selectively isolate that signal so that its waveform parameters can be estimated, its data demodulated, and its waveform reconstructed. Each reconstructed CDMA waveform is individually adjusted in amplitude and phase to cancel its particular CDMA signal from the composite input of multiple CDMA signals. This receiver structure allows cancellation at the input of each receiver signal processing channel of all CDMA signals except the particular desired signal for that channel.

10 Claims, 3 Drawing Sheets

MULTIPLE SIGNAL RECEIVER FOR DIRECT SEQUENCE, CODE DIVISION MULTIPLE ACCESS, SPREAD SPECTRUM SIGNALS

BACKGROUND OF THE INVENTION

Direct sequence phase modulation by pseudo-random spread spectrum codes has often been considered to allow use of a network of simultaneous multiple access communications and navigation using data-modulated signals occupying a common frequency band. Such a network is often referred to as a direct sequence code division multiple access (DS-CDMA) system. In such a system, each signal's unique spread spectrum code is used to digitally phase modulate the carrier at a ("chip") rate that is a very large multiple of the data modulation rate. Since this process spreads the signal bandwidth, the ratio of these two rates is termed the bandwidth spreading ratio (SR).

In prior art DS-CDMA receivers, signal selectivity has been accomplished in each receiver channel by correlation of the composite received signal with a locally generated synchronized replica of the desired signal's code. The result of this code matched filtering process is a selective enhancement of one desired signal's power over that of each of the other signals by a factor equal to SR, thereby suppressing mutual interference.

One of the major limitations to the use of DS-CDMA systems for radio networks using the conventional CDMA receiver structure is termed the near/far problem. This problem arises when weak and strong cochannel CDMA signals are received simultaneously. When the ratio of their received signal powers approaches or exceeds SR, the selective enhancement of a weaker signal is insufficient to overcome the interference from the stronger signals, and acquisition and accurate demodulation of the weaker signal becomes impossible. Since large ratios of signal strength are ofter associated with large differences in propagation distance, this situation has been termed the near/far problem. The subject invention is aimed at overcoming the near/far problem.

The prior art of DS-CDMA systems has been summarized in a journal article by Schilling et al, entitled "Spread Spectrum Goes Commercial," appearing in the August 1990 issue of the *IEEE Spectrum*. In that publication the authors envision using a technique called adaptive power control to overcome the near/far problem. Their technique requires sensing the received power level of each CDMA signal, and commanding the transmitters of those signals that are too strong to set back their transmitted power levels as needed to allow reliable demodulation of the weaker signals. This technique requires an active return communication link from the receiver back to each active transmitter and the means to adjust the power of each CDMA transmitter. The subject invention uses a completely different approach to overcoming the near/far problem, one which is totally contained within the receiver itself so that no active return communication links to the transmitters are required and one that can operate with simpler constant power transmitters.

Accordingly, it is an object of the present invention to provide an improvement in DS-CDMA receiver apparatus.

It is another object of the present invention to provide a DS-CDMA receiver apparatus which includes improved signal selectivity by using correlations with each received signal's spread spectrum code, not only to selectively enhance each received signal but also to selectively suppress all the other DS-CDMA received signals, thereby overcoming the near/far problem.

It is another object of the present invention to provide a DS-CDMA receiver apparatus which includes means for estimating and reconstructing replicas of the waveforms of the DS-CDMA received signals with minimal time delay, and then subtracting these reconstructed waveform replicas from the receiver input so as to effect cancellation of their corresponding DS-CDMA received signals.

It is another object of the present invention to overcome the near/far problem without the requirement for a return communication link to the CDMA transmitters and without the requirement that the CDMA transmitters have means to adjust their output RF power level.

DESCRIPTION OF THE INVENTION

These and other objects are accomplished in this invention. The new DS-CDMA receiver focuses first on separate estimations of the parameters of the individual DS-CDMA signal waveforms that are present at its input so that the waveforms can be reconstructed and used to cancel each signal waveform with minimal interference effects from the other signals. Demodulation of each signal is mostly a by-product of its estimation process.

The estimation process makes use of information known about each waveform—its SS code, its modulation structure, and its data rate. Parameters that are important to reconstruct each signal waveform are estimated in each channel of the receiver—the carrier frequency and phase, the modulating data, the amplitude, and the synchronization of the spread spectrum code.

Figure 1:
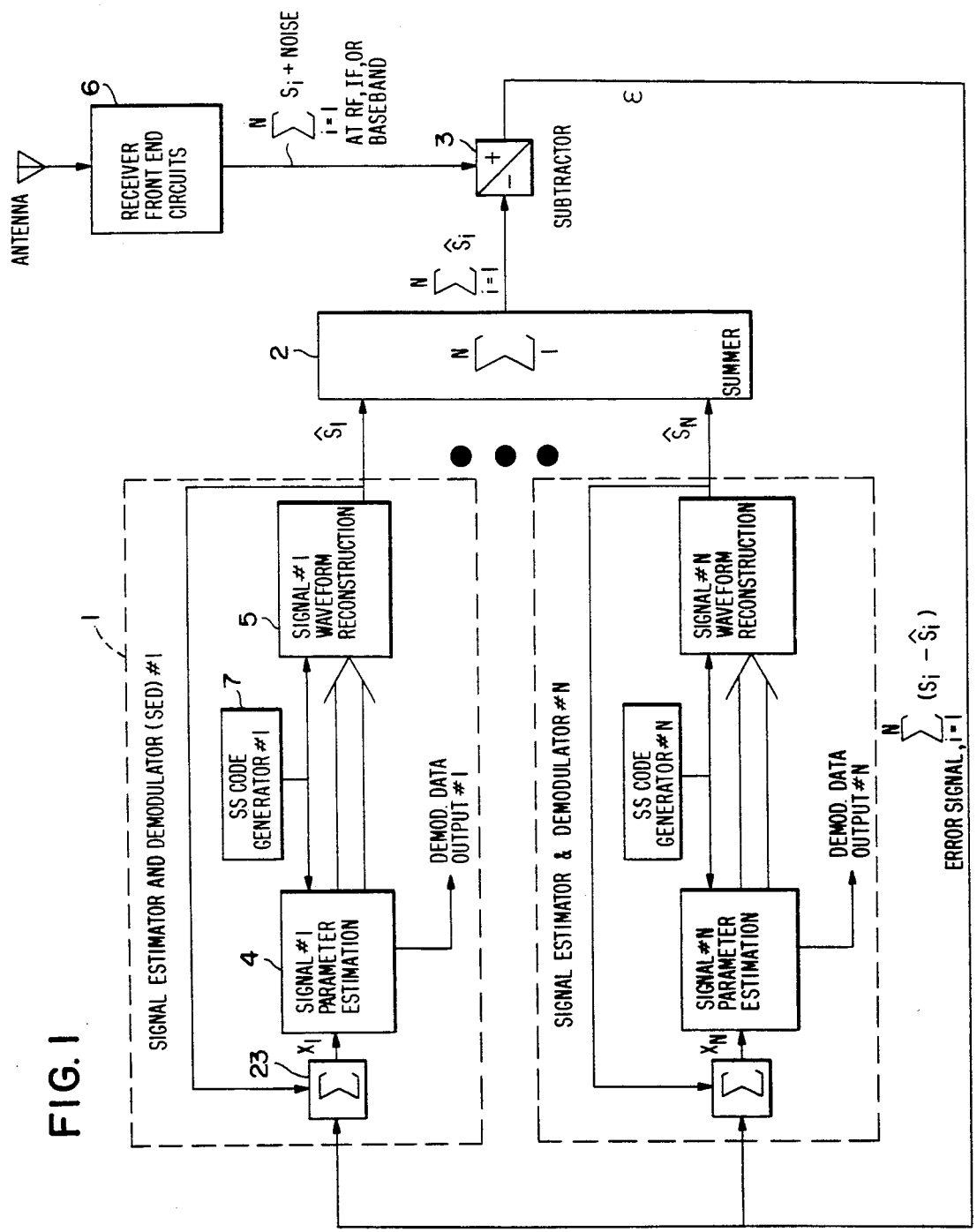
FIG. 1 is a block diagram generally illustrative of the electrical signal processing concepts embodied in the present invention.

The DS-CDMA receiver concepts are depicted in the block diagram of FIG. 1. There are N Signal Estimator and Demodulator (SED) channels 1, one for each of the DS-CDMA signals. The $k^{TH}$ SED channel produces $\hat{S}_k$, the reconstructed replica of the $k^{TH}$ input signal component waveform $S_k$. The $\hat{S}_k$ reconstructed waveform replicas are all combined together in a summer 2. The sum is then subtracted from the received combination of DS-CDMA signals in a combiner 3 to form an error signal in which all of the CDMA signals are canceled. The receiver combination of DS-CDMA signals is obtained through receiver front end circuits 6 at RF, IF, or baseband. The error signal is the input common to all N of the Signal Estimator and Demodulator channels. Each channel concentrates its attention on minimizing the power of that component of the common error signal that correlates with its spread spectrum code to keep its waveform estimate as accurate as possible.

Each Signal Estimator and Demodulator channel performs two major functions-signal parameter estimation 4 and reconstruction of the estimated signal waveform 5. In order to estimate the parameters of its signal as accurately as possible, we would like the $k^{TH}$ signal parameter estimator to be presented with the $k^{TH}$ signal at full strength, and all other CDMA signals canceled. This is accomplished by adding $\hat{S}_k$ to the error signal in the summer 23 forming the signal $X_k$, where $$X_k = \hat{S}_k + \sum_{i=1}^{N} (\hat{S}_i - S_i) = S_k + \sum_{\substack{i=1 \\ i \neq k}}^{N} (\hat{S}_i - S_i).$$

The signal $X_k$ is then fed into the signal parameter estimation portion of Signal Estimator and Demodulator #k. Thus, $X_k$ contains signal $S_k$ uncanceled plus all other signals canceled by their waveform replicas that are generated in the other SED channels. At that point SS code #k from the $k^{TH}$ SS code generator 7 is used to strip the SS modulation thereby producing the narrowband $k^{TH}$ data signal so that the estimation of the carrier frequency and phase, signal amplitude, and data modulation can proceed. The demodulated data output is obtained along with the estimate of the data modulation. The estimated waveform parameters, along with the SS code, are provided to the waveform reconstruction portion of Signal Estimator and Demodulator #k, which produces the reconstructed signal waveform replica $\hat{S}_k$.

The receiver apparatus for special situations may be structured somewhat differently from that shown in FIG. 1, whereby cancellation is applied only to those signals strong enough to significantly interfere with the weakest signal. Yet another alternative would be to arrange the channels in a feedforward cascade configuration, in which each channel does the estimation, demodulation, waveform reconstruction, and cancellation of one signal, feeding its cancellation output to the next channel. Such a cascade arrangement would work best if the channels were arranged in order of the signal strengths, strongest first to weakest last. Any of these alternative structures would not operate as well as the structure of FIG. 1 because in FIG. 1 the simultaneous cancellation of all signals leads to the most accurate parameter estimation and demodulation of each of the signals. Furthermore, the receiver structure of FIG. 1 does not have to be reorganized as relative signals strengths fluctuate. A final consideration is that the concept of canceling all signals but the desired one at the input of each receiver channel is implemented efficiently in FIG. 1, which has an implementation complexity that expands linearly with the number of channels as opposed to other conceivable means of interconnection of receiver channels which may expand in proportion to the square of the number of channels.

In general the signal parameter estimation portion of each SED receiver channel will contain a subsystem to estimate the frequency and phase of its signal's carrier and a subsystem to estimate the timing synchronization of its spread spectrum code. When its particular signal is initially presented these subsystems operate in an "acquisition" mode during which the estimation errors are reduced to suitably small values. Following the "acquisition" mode these subsystems operate in a "track" mode, during which the tolerably small estimation errors are maintained and the data may be reliably demodulated. The structure shown in FIG. 1 provides its cancellation protection against inter-signal interference to each channel during both its "acquisition" mode and its "track" mode.

Implementation of the spread spectrum code synchronization function in this CDMA receiver is the same as in a conventional DS-CDMA receiver and is straightforward to one skilled in this art.

DESCRIPTION OF THE PREFERRED EMBODIMENTS

The description of the preferred embodiment is presented for both data and spread spectrum modulation in a binary phase-shift keying format. This format is used for illustration purposes only. The invention applies to all modulation formats usable in direct sequence spread spectrum signals including but not limited to quadriphase, staggered quadriphase and minimum shift keying modulation.

The previous description of the ZA CDMA receiver concept presented the two main functions of the Signal Estimator and Demodulator as occurring sequentially—first estimation of the signal parameters and then reconstruction of the estimated waveform. It is not necessary to perform those functions sequentially, and they can in fact be interleaved, as in the block diagram of FIG. 2. Signal Estimator and Demodulator #1 is diagrammed in detail in FIG. 2. The others are identically structured.

Figure 2:
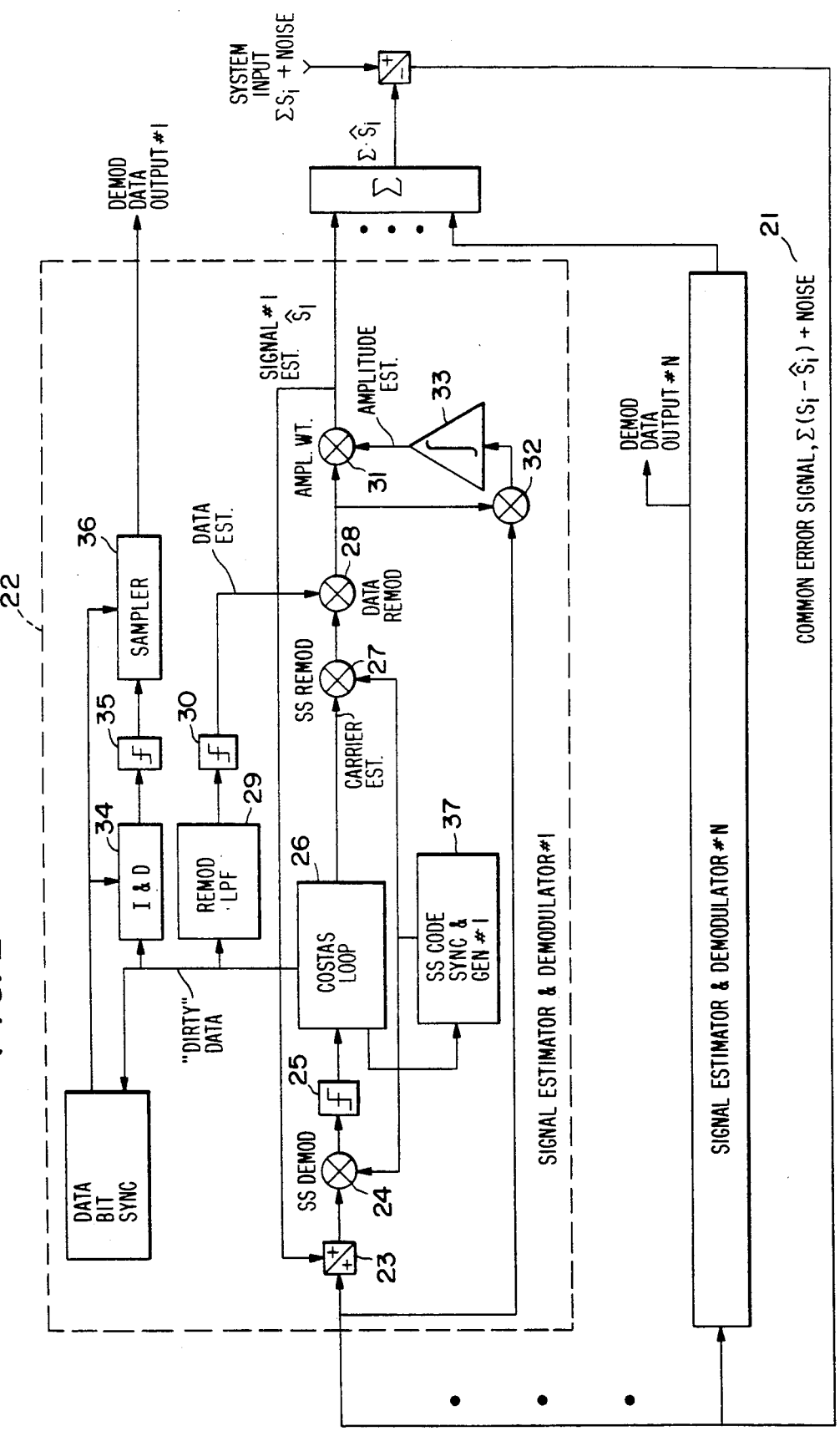
FIG. 2 is an electrical block diagram generally illustrative of the preferred embodiment of the subject invention as it would be applied with a binary phase-shift keyed (BPSK) signal modulation format.
Figure 3:
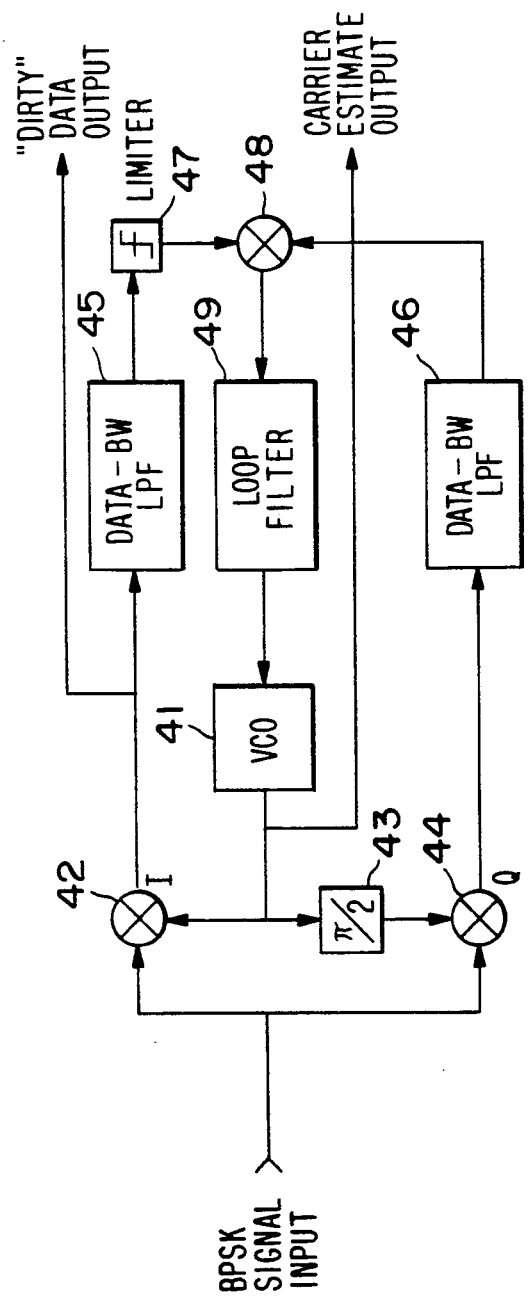
FIG. 3 is an electrical block diagram of a BPSK Costas loop used in FIG. 2 for acquiring and estimating signal carrier frequency and phase.

The error signal 21 in FIG. 2, formed in the same manner as described in FIG. 1, is the input to all the Signal Estimator and Demodulator (SED) channels 22. After it enters the SED, it is combined in summer 23 or combiner with the SED's output to remove cancellation of the SED's particular signal. The SED's SS code, generated and synchronized to the signal's code by the SS code generator 37, is then used to strip the SS modulation from its signal (SS demod) in mixer or multiplier 24. A hard limiter 25 follows the SS demod, after which a Costas loop 24 is used to extract both an estimate of the carrier and "dirty" data. (Detail of the Costas loop for biphase modulated data is shown in FIG. 3.) The estimated carrier is then remodulated with the clean SS code chips in mixer 27 and the estimated data in mixer 28, where the estimated data is obtained by lowpass filtering of the "dirty" data in Remod LPF lowpass filter 29 followed by hard limiting in limiter 30. The amplitude estimate is then applied by an amplitude weight multiplier 31 to complete the reconstruction of the SED's signal. The amplitude estimate is formed in an LMS (least mean square) feedback loop by correlating the amplitude weight input with the error signal 21 in multiplier 32 and integrator 33. The time constant of the LMS control loop should be fast enough to follow the rate of any amplitude fluctuations that may be the result of fading on the communications link.

The demodulated data output is obtained by matched filtering the Costas loop's "dirty" data through an integrate and dump filter 34, hard limiter 35, and sampler, which samples just before dumping. This process produces an output data stream that is delayed by a full data bit duration from the data modulation at the system input. While this delay is ordinary and tolerable in the demodulation process, it is not tolerable in the process of constructing $\hat{S}_l$. In order for $\hat{S}_l$ to provide deep cancellation of $S_l$, it must be both accurate and timely. This dual requirment provides a dilemma in the selection of the bandwidth of the Remod LPF. A wider bandwidth means less delay (more timely), but greater susceptibility to disturbance by noise and the cancellation residues of other signals (less accurate). A narrower bandwidth improves accuracy but degrades timeliness.

The above dilemma is resolved through the following rationale. A stronger signal allows inherently greater estimation accuracy by virtue of its signal strength, so that enhancing the timeliness of its waveform estimate by widening the bandwidth becomes more important. A weaker signal needs narrower bandwidth for greater protection against disturbance by noise and other cancellation residues. This line of reasoning has led to the following empirical relationship to select the optimal bandwidth of the Remod LPF in each channel:

$$B_{Ri} = (0.3/T_B)\sqrt{E_{Bi}/N_O}$$

where $B_{Ri}$ is the optimal bandwidth of the $i^{TH}$ channel single-pole Remod LPF in Hz, $E_{Bi}$ is the $i^{TH}$ signal energy per data bit, $N_O$ is the input noise spectral density (one-sided), $T_B$ is data bit duration in seconds. Since $T_B$ is known and $N_O$ can be measured in the common error signal, control of $B_{Ri}$ may be implemented as follows.

Set $$B_{Ri} = 0.3[1/T_B + A_i/\sqrt{N_O}]$$

where $A_i$ is the amplitude estimate formed in the $i^{TH}$ SED. During initial adaptation in which $A_i$ may start at zero, $B_{Ri}$ maintains a useful value of $0.3/T_B$. As $A_i$ increases during the adaptation process to the actual signal amplitude, $B_{Ri}$ increases to approximate its optimum value.

Once bit synchronization has been established by techniques that are well known to those skilled in this art, the Remod LPF input can be structured as an integrate and dump filter with a continuous output instead of an output that is sampled just before the integrator is dumped. The integrator is dumped at the end of each bit interval. When the integrate and dump filter is used, no adjustment of its bandwidth is required.

The $k^{TH}$ Costas loop used in FIG. 2 is diagrammed in FIG. 3, representing a well-known function. It is used to phase-lock the output of voltage-controlled oscillator (VCO) 41 to the suppressed carrier of the $k^{TH}$ binary phase-shift keyed input signal so that the signal can be synchronously demodulated. The output of VCO 41 is used directly to beat with the binary phase shift keyed (BPSK) loop input signal in mixer 42. The VCO output is also shifted by 90 degrees in phase shifter 43 to then be used to beat with the loop input signal in mixer 44. The output of mixer 42 provides the "dirty" data output signal from the Costas loop. The inphase (I) output of mixer 42 is filtered in lowpass filter 45 whose bandwidth is approximately that of the data. The quadriture (Q) output of mixer 44 is filtered in a similar lowpass filter 46. The output of filter 45 is applied to a limiter 47, after which it is multiplied in multiplier 48 with the output of filter 46. This multiplication process produces a carrier tracking feedback error signal with a low frequency component that is proportional to sin 2θ, where θ is the phase error to be driven to zero. The output of multiplier 48 is integrated in loop lowpass filter 49, whose output voltage adjusts the frequency of VCO 41. After a transient acquisition time, the Costas loop settles to operate with very low phase (and frequency) error between the output of VCO 41 and the carrier of the $k^{TH}$ BPSK input signal. Thus, the frequency and phase of the output of VCO 41 are good estimates of the $k^{TH}$ carrier frequency and phase.

Because the SED channels are all identical in structure, it is possible to implement multiple SED channels by time-sharing many of the functional units therein. Such an implementation approach may be the most economical in many situations.

While the invention has been particularly shown and described with reference to a preferred embodiment thereof, it is to be understood from the foregoing that other changes and modifications in the form and details may be made without departing from the spirit and scope of the invention as set forth in the subtended claims.

What is claimed is:

1. Radio apparatus for operating as a multiple channel signal receiver for multiple, direct sequence (DS), spread spectrum (SS), code division multiple access (CDMA) signals received at one location from multiple transmitters located at widely varying distances from said apparatus, said apparatus comprising:
   a receiver means for substantially simultaneously receiving different CDMA signals from an antenna means and supplying a first composite signal in response thereto;
   a subtractor means which receives at a first input thereof, a first composite signal from said receiver means;
   an interference cancellation system comprising a plurality of signal combining means which each have inputs and an output, and a corresponding plurality of CDMA SS estimator-demodulator means;
   at least one of said estimator-demodulator means comprising a SS code generator for selectively supplying a specific SS code sequence signal, a signal parameter estimation means, responsive to a specific SS code sequence signal from said SS code generator and an output from an associated one of said signal combining means, for generating an estimated data signal and an estimated carrier signal, a CDMA waveform reconstruction means, responsive to an estimated data signal and an estimated carrier signal from said estimation means, for generating a reconstructed CDMA signal, and a weighting means for weighting said reconstructed signal from said reconstruction means to produce a waveform estimation signal and applying said waveform estimation signal to an input of said summing means and to a first input of said associated combining means;
   said summing means summing waveform estimation signals from each of said estimator-demodulator means to produce a second composite signal, and applying its produced second composite signal to a second input of said subtractor means, said subtractor means subtracting a first composite signal from said receiver means from a second composite signal from said summing means to provide a common error signal which is applied to a second input of at least said combining means associated with said at least one estimator-demodulator means for causing said at least one estimator-demodulator means to reject all received CDMA signals other than a received CDMA signal having a SS code sequence which is the same as said SS code sequence signal supplied by its SS code generator, whereby said interference cancellation system prevents relatively strong CDMA signals from rendering said at least one estimator-demodulator means unresponsive to relatively weak SS signals.

2. The radio apparatus as defined in claim 1 wherein said weighting means comprises multiplier means and integrator means, said weighting means producing its estimation signal in response to a common error signal from said subtractor means, a reconstructed signal from said CDMA waveform reconstruction means, and an amplitude estimation signal generated by said integrator means.

3. The radio apparatus as defined in claim 2 wherein said multiplier means comprises a first multiplier which receives as inputs said common error signal and said reconstruction signal and applies an output to said integrator means, and a second multiplier which receives as inputs said reconstructed signal and said amplitude estimation signal and applies said waveform estimation signal as an output to said summing means.

4. The radio apparatus as defined in claim 3 wherein said CDMA waveform reconstruction means comprises a third multiplier which receives a carrier estimation signal from said signal parameter estimation means and a SS code sequence signal from its associated SS code generator as inputs, and supplies a remodulation signal, and a fourth multiplier which receives as inputs a remodulation signal from said third multiplier and a data estimation signal from said parameter estimation means and applies as an output, said reconstructed signal to said second multiplier.

5. Radio apparatus for operating as a multiple channel signal receiver of multiple, direct sequence (DS), spread spectrum (SS), code division multiple access (CDMA) signals received at one location from multiple transmitter locations of widely varying distances, comprising:
  a receiver means for receiving a composite CDMA signal from an output of an antenna means and supplying a composite signal in response thereto;
  a interference cancellation system having one output and N inputs which are adaptively weighted and summed for cancelling the composite signal output by said receiver means to prevent strong CDMA signals from rendering CDMA SS demodulators unresponsive to weak SS signals and having as said output a composite common error signal;
  the interference cancellation system comprising a CDMA SS demodulator, signal parameter estimator and CDMA waveform reconstructor for each of the N CDMA signals received by the receiver means for selective enhancement of each CDMA signal, and providing as parallel outputs, estimate signals representative of the N received CDMA signals;
  a set of N two-input combiners, each combiner adding the composite common error signal to an output of a CDMA waveform reconstructor, an output of each two-input combiner being connected to the input of the associated SS demodulator, signal parameter estimator and CDMA waveform reconstructor for separating, prior to demodulation, each received CDMA signal by selective rejection of other unwanted CDMA signals; and
  a set of N SS code synchronizers and generators, each being operable to select a specific SS code sequence which is the same as the SS code of a received CDMA signal, and each said code generator outputting its SS code sequence, time synchronized to the SS code of a received CDMA signal, for removal of the SS code by multiplication in the SS demodulator and for SS code remodulation by multiplication in the CDMA reconstructor.

6. The radio apparatus as defined in claim 5 wherein the said receiver means further includes circuit means for down-converting a composite RF CDMA signal of a predetermined frequency band to an IF CDMA signal and wherein said interference cancellation system operates at IF.

7. The radio apparatus as defined by claim 6 wherein the interference cancellation system includes:
  a first means for estimating each CDMA waveform and isolating it from all other CDMA signals;
  a second means for providing individual CDMA reference signals as the outputs of the CDMA waveform reconstructors;
  a third means for adaptively adjusting the amplitude and phase of said CDMA estimate signals to effect cancellation of the received composite CDMA signal when combined with the received composite CDMA signal from the said antenna means, having as an output the composite error signal;
  a fourth means for connecting the composite error signal output from said third means for use as a common feedback error signal to all CDMA SS demodulators and all amplitude and phase adjustment circuits, for cancellation of all CDMA signals at a common point in the output of the interference cancellation system; and
  a fifth means coupled to the third and fourth means for splitting and algebraically combining the composite common error signal individually with each adjusted CDMA reference signal to form the selectively enhanced input to each CDMA SS demodulator.

8. The radio apparatus as defined in claim 6 wherein the said receiver means further includes a pair of quadrature local oscillator and mixer circuit means for down-converting a received composite CDMA signal of a predetermined band to baseband inphase (I) and quadrature (Q) components which are outputted to I and Q baseband subtractors of a baseband interference cancellation system (ICS), the baseband ICS having a pair of identical amplitude modulators for adjusting the amplitude of the CDMA reference signals' I and Q components to cancel the I and Q components of the received composite CDMA signal and having as a cancelled output baseband I an Q components of the composite common error signal fed back to I and Q SS demodulators and I and Q component CDMA waveform reconstructors.

9. The radio apparatus as defined in claim 8 wherein the receiver means further includes circuit means for sampling and digitizing the inphase and quadrature baseband components of the received composite CDMA signal and wherein the CDMA SS demodulation and CDMA waveform reconstruction operations take place in digital circuits which are controlled by a microprocessor by means of a software program.

10. The radio apparatus as defined in claim 5 wherein the same SS code is selected using the input means for all N SS code generators for code delay adjustment, and having outputs of the N SS code synchronizers connected to the SS demodulators and waveform reconstructors for tracking and isolating the distinct CDMA signal components, the CDMA signal components having distinct delays imparted by the multipath components of a radio propagation link, for functioning as an anti-multipath communication receiver by outputting the data from the SS demodulator whose synchronized SS code sequence has the smallest delay.

* * * * *